(12) United States Patent
Gonzales et al.

(10) Patent No.: US 6,834,208 B2
(45) Date of Patent: Dec. 21, 2004

(54) METHOD AND APPARATUS FOR PROVIDING DISTRIBUTED CONTROL OF A HOME AUTOMATION AND CONTROL SYSTEM

(75) Inventors: Greg Gonzales, Las Cruces, NM (US); Brian D. Baker, Tucson, AZ (US); Sara White, Las Cruces, NM (US)

(73) Assignee: Microsoft Corporation, Redmond, WA (US)

( * ) Notice: Subject to any disclaimer, the term of this patent is extended or adjusted under 35 U.S.C. 154(b) by 255 days.

(21) Appl. No.: 10/154,425

(22) Filed: May 22, 2002

(65) Prior Publication Data

US 2003/0040812 A1 Feb. 27, 2003

Related U.S. Application Data

(63) Continuation-in-part of application No. 09/955,570, filed on Sep. 17, 2001, now abandoned, which is a continuation of application No. 09/751,383, filed on Dec. 29, 2000, now abandoned.
(60) Provisional application No. 60/173,741, filed on Dec. 30, 1999.

(51) Int. Cl.$^7$ .............................................. G05B 19/42
(52) U.S. Cl. ............................... 700/86; 700/9; 700/11; 700/17; 700/19; 700/76; 700/83; 700/87; 700/276; 700/264; 315/294; 315/295; 315/297; 315/291; 315/307; 315/312; 315/324; 345/866
(58) Field of Search ............................. 700/83, 86, 87, 700/76, 9, 11, 19, 17, 276, 264, 12, 47, 20, 18, 23; 315/294, 295, 297, 291, 307, 312, 324; 345/866

(56) References Cited

U.S. PATENT DOCUMENTS 5,187,655 A * 2/1993 Post et al. ..................... 700/17
5,560,322 A * 10/1996 Fitzgerald ..................... 122/64
5,621,662 A    4/1997 Humphries et al.
5,677,603 A * 10/1997 Speirs et al. ................. 315/324
5,706,191 A *  1/1998 Bassett et al. ................. 700/9

(List continued on next page.)

OTHER PUBLICATIONS

CEBus Industry Council (CIC), *HomePnP™ Specification Version 1.0, Home Plug & Play™: CAL–Based Interoperability for Home Systems*, Indianapolis, Ind., Apr. 9, 1998, pp. 1–111.

(List continued on next page.)

*Primary Examiner*—Anthony Knight
*Assistant Examiner*—Thomas Pham
(74) *Attorney, Agent, or Firm*—Christensen O'Connor Johnson Kindness PLLC

(57) ABSTRACT

A method and apparatus for providing distributed control of a home automation and control system is provided. Each device participating in a home automation and control system is equipped with control logic for providing distributed control. Through the control logic, each device maintains scene definitions describing the state of the device for each scene in which it participates. When any device in the system receives a request to launch a scene, such as a button press on one of the devices, the device broadcasts a scene state change message to all devices within the home automation and control system. The scene state change message identifies to each device that a particular scene that should be launched. Each device in the system receives the message and determines whether the device is a participant in the scene. If the device is a participant in the scene, the device adjusts its state according to a scene definition stored in the device associated with the scene. The device may adjust a controlled electrical load, such as a light, according to the scene definition by turning the load on, off, or setting the load to some intermediate value. If the device is a not participant in the scene, the device remains unaffected.

2 Claims, 11 Drawing Sheets

U.S. PATENT DOCUMENTS

| | | | |
|---|---|---|---|
| 5,841,360 A | | 11/1998 | Binder |
| 5,877,957 A | * | 3/1999 | Bennett ........................ 700/86 |
| 6,466,234 B1 | * | 10/2002 | Pyle et al. ................... 345/771 |
| 6,545,434 B2 | * | 4/2003 | Sembhi et al. .............. 315/312 |

OTHER PUBLICATIONS

Evans, Grayson, "CEBus: Defining the Future of Residential Communications," *Australian Electronics Engineering* 30(3):34–36,38, Mar. 1997.

Lawrenz, Wolfhard, "eBUS—Der Bus für die Heizungstechnik," *Elektronik* 47(2):60, 62, 64–66, Jan. 20, 1998.

Markwater, Brian, and Larry Stickler, "Design Techniques for Plug–and–Play in 'Smart Homes' and Consumer Products," *Electronic Design* 45(17):64–66, 68, Aug. 18, 1977.

Tsang, Peter W. M., and Raymond W. C. Wang, "Development of a Distributive Lighting Control System Using Local Operating Network," *IEEE Transactions on Consumer Electronics* 40(4):879–889, Nov. 1, 1994.

Wright, Maury, "Home–Automation Networks Mature While the PC Industry Chases a New Home LAN," *EDN*, Jun. 4, 1998, pp. 101–102, 104, 106, 108, 110, 112–114.

* cited by examiner

METHOD AND APPARATUS FOR PROVIDING DISTRIBUTED CONTROL OF A HOME AUTOMATION AND CONTROL SYSTEM

CROSS-REFERENCE TO RELATED APPLICATION

This application is a continuation-in-part of U.S. patent application Ser. No. 09/955,570, filed Sep. 17, 2001 now abandoned, which is a continuation of U.S. patent application Ser. No. 09/751,383, filed Dec. 29, 2000, now abandoned, which claims the benefit of prior U.S. Provisional Patent Application Ser. No. 60/173,741, filed Dec. 30, 1999, each of which applications is expressly incorporated herein by reference.

FIELD OF THE INVENTION

The present invention relates to the field of home automation and control systems and, more particularly, to a method and apparatus for providing distributed control of dynamically created home automation and control system scenes.

BACKGROUND OF THE INVENTION

Home automation and control systems are used to control the behavior of an environment such as a home or office building. Home automation and control systems allow home occupants to automate and control the use of electrical products and appliances in and around the house. Home automation and control systems create and launch "scenes," also called house scenes, involving one or more products and appliances. Examples of the types of products and appliances that can be automated and controlled are lighting, entertainment, cooking, heating, air conditioning, window treatments and landscaping. Examples of specific products and appliances that can be automated and controlled are lights, television sets, sound systems, coffee machines, ovens, furnaces, air conditioners, water heaters, humidifiers and lawn sprinklers. Each product or appliance can be set to a number of different states, i.e., on, off, and, if appropriate, an intermediate level. The controller of an electrical product or appliance, together with its effect on the controlled electrical product or appliance, will be referred to as a "device." The "load control button" on a device is the button on the device controller that directly controls or affects the electrical product or appliance. The controller may be a physically separate entity from the product or appliance being controlled, or the controller may be physically embedded or integrated into the product or appliance being controlled.

A "scene" includes one (1) or more devices set to a particular state. For example, a morning scene could include the furnace set to 70°, the master bathroom lights on at 50%, the kitchen lights on at 100%, the coffee machine on, the television set in the kitchen on to a particular channel, and the front porch light off. This setting of devices constitutes one scene, and may be triggered by a trigger event also defined by the user, such as the press of a button on a remote control. A different scene may set additional devices and some or all of the members of the one scene to the same or different states. Current home automation and control systems are based on controlling devices through device resources, but these device resources are not interoperable between unlike resources. Current home automation and control systems require someone or something in the programming process to understand the details of the system device resources or each type of device resource in the system to create complex scenes. Current home automation and control systems create and launch scenes using several methods, each of which have significant drawbacks.

One method used by current home automation and control systems is to divide the devices into groups that all respond in basically the same way to a command. Some groups are composed of like type device resources, and other groupings allow mixed type resources, but all like-type device resources are limited to the same actions—i.e., a group command received by like type device resources in the group will force each of those devices to the same state. This method does not provide the flexibility that in one scene some of the same type devices might be on and others off, while in another scene all of the devices might be on. Such an approach is, thus, limited to simple, synchronized scenes. In current home automation and control systems able to create more complex scenes, a central controller is commonly used, with a scene being launched, or triggered, when the central controller detects the trigger event. In response to detecting the trigger event, the central controller sends messages to the devices that are members of the scene directing them to go to their respective scene states. If the central controller fails, scenes can no longer be triggered because the controller can no longer send the necessary messages to the scene member devices to produce the scenes. In effect, if the central controller fails, the entire home automation and control system is rendered unusable. This single point of failure is highly undesirable to users of such systems. Additionally, the use of a central controller creates a heavy load of network traffic, since the central controller must send a message to each scene member device individually. The message traffic on the communication network for a central controller based scene with many member devices grows proportionally with the number of devices. For a scene with a large number of devices, this also causes a time delay time between the start of the scene when the first device gets its message until the last device gets its message. Such heavy network traffic and delay in triggering scene member devices is also undesirable to users of home automation and control systems.

Another method used by current home automation and control systems is to create pre-defined scenes sometimes called home modes. Examples of such home modes are "away" or "home" or "vacation" scenes. A device receiving a scene launch command will know what state the device should be in for the chosen home mode, but the scene state is determined by the manufacturer for a particular device subtype. If the manufacturer defined home mode does not entirely produce the scene state desired by the home user, or different states are desired for the same device types (a night scene has all lights out except a nightlight in the bathroom, as an example) the scene can not be modified. Furthermore, such home automation and control systems can have only one active home mode at a time, and the home mode affects all devices in the system. This is not desirable in a house with multiple users, where each user may want to select a different scene to control the user's local environment at the same time, without affecting any system devices not in the scene desired by the user.

In other current home automation and control systems able to create more complex scenes, a specialized central programming tool is used to create complex scenes that, once programmed, can operate in a distributed fashion—i.e., do not then require a central controller to send multiple messages to set the respective states of multiple devices each time a scene is triggered. However, the central programming tool may or may not be a permanent part of such a home automation and control system; and if the central programming tool is lost or fails, the system cannot be reconfigured. This can be a problem when the user of the home automation and control system wishes to reconfigure the system— particularly when a new home owner finds the central programming tool went with the previous owner's computer or has otherwise been lost.

Also, the central programming tool is typically specialized, in that it is limited to devices types that were known or contemplated when the original home automation and control system was installed. Thus, the central programming tool cannot reconfigure the system to incorporate newly developed device types, such as new media players, environmental control devices, etc., for which the programming tool does not have the requisite programming instructions. Thus, adding such new devices necessitates upgrades to the central programming tool. Furthermore, the addition of devices, whether originally contemplated or not, may reach a number exceeding the central programming tool or central controller limitations for number of devices in a scene.

Therefore, in light of the above, there is a need for a distributed and interoperable home automation and control scene method that provides dynamic complex scene creation but does not increase scene launch message traffic proportionally to the number of devices in the scene and that does not require someone or some entity in the programming process to understand the details of the system devices or each type of device in the system to create complex scenes.

SUMMARY OF THE INVENTION

In accordance with the present invention a distributed home automation and control system method and apparatus is provided. The method and apparatus creates and launches scenes in a way that does not increase scene launch message traffic proportionally to the number of devices in the scene and does not require someone or some entity in the programming process to understand the device type details of the system. Scenes are created system wide and may be called "house scenes." "House" in this case means any type of premises, including homes, offices, boats, yards, etc. Each device in the system knows its own device-type details and is capable of dynamically learning the current state of those device-type details such that it can duplicate the current device state in a scene at a latter time without any external entity at any time knowing the device type-details. Instead of a programming tool or central controller learning the scene trigger(s) and scene state for each system device, each individual device learns its membership status in each house scene and the load state of the product or appliance controlled by the device.

In accordance with other aspects of this invention, each house scene is assigned a unique house scene identifier. House scenes are created by each individual member device, when given an indication to learn a new house scene, locally saving its membership status and the load state of the product or appliance associated with the house scene identifier, the product or appliance load state being the current state of the device when the device is given the indication to learn a new scene. When a non-member device is given the indication to learn a new scene, the device need not save any house scene information for that house scene identifier.

In accordance with further aspects of this invention, scene launch commands are generated by the actuation of scene trigger buttons. Trigger buttons may have fixed house scene identifiers associated with them, or a trigger button may learn a system resource house scene identifier to be associated with the actuating trigger button. Preferably, trigger buttons do not have predefined house scene identifiers associated with them. Also, preferably, each trigger button obtains and learns the house scene identifier at the time when it is associated with a house scene. When given an indication to learn a new system resource house scene identifier as a scene trigger, the device locally saves and associates the house scene identifier with the indicated particular scene trigger button. When the scene trigger button that has learned or been associated with a house scene identifier is activated, the activated scene trigger button launches the house scene by broadcasting a launch command to the entire network that contains the associated house scene identifier.

In accordance with yet other aspects of this invention, when a device in the network receives a broadcast scene launch command and the device membership status associated with the received house scene identifier indicates the device is a scene participant of that house scene, the device recalls the locally saved scene state associated with that house scene identifier. This allows one simple, short message containing the scene identifier to launch a scene in normal operation without regard to the number of scene members. The message does not tell the member devices how to implement a particular house scene, it only identifies the particular house scene to be launched. In accordance with yet still other aspects of this invention, alternatively, or in addition, a house scene can be launched by another entity, such as software running on a personal computer or an external controller, that is able to broadcast a scene launch command containing the house scene identifier for that particular house scene. While the system house scene resource is most desirable when the scene launch is broadcast to the network, those skilled in the art will appreciate that for network protocols where network broadcast addressing is not robustly supported or desirable, a scene launch identifier message could be addressed to each scene member device, individually or in a combined addressing scheme.

As will be appreciated from the foregoing description, the invention provides distributed programming and control of a home automation and control system. Each system device maintains scene definitions describing the state settings of the device for each scene in which the device participates as a scene member. Because the scene state setting and programming logic is embedded within each device participant, the control and programming of the system is distributed, thereby eliminating the single point of failure found in previous home automation and control systems. While any device in the system may fail, the other devices will continue to know their scene state settings and operate normally when a scene launch command is received. While any device in the system may fail and not be reprogrammable, such failure will not prevent other devices from being reprogrammable. Other devices will continue to be reprogrammable.

One benefit of the invention is a reduction in the expertise required to create complex scenes when compared to prior art solutions. Only devices need to know the details of their particular type in order to save a house scene state. No specialized knowledge of the devices to be included in a scene is needed by a central controller or centralized programming tool. There is no need for any entity outside the local device to ever know the local device scene setting associated with a particular house scene state, and no central controller is needed to create complex scenes. Each device can potentially be a member of many scenes. There is no limit to the number of system devices that can be members of a house scene. House scenes can include and exclude devices regardless of zone and group boundaries. A new device type can be incorporated into an existing house scene, even though that device type was totally unknown at the time the original scene was developed. No existing entity in the system outside the new device needs to know the details of the type of new device, and no upgrades to any existing device, central controller or programming tool are needed to add the new device to a house scene.

Another benefit of the invention is a reduction in the network traffic required to launch a complex scene as compared to central controller prior art solutions. Only a single trigger message with the scene identifier must be sent to devices participating in a scene in order to launch the scene. There is no requirement for a central controller to send a "set device" command to each different scene member, group or zone. No other message traffic is necessary. Each device maintains its own scene definition for each scene describing the state of the device for the scene. Therefore, the launch scene command only needs to identify the scene to system devices in order for the scene to be launched. This message protocol allows scene control to be distributed throughout the home automation and control system, and also reduces the delay found in current central-controller-based home automation and control systems between the time a trigger event is received and when the last scene member is activated.

Generally described, the present invention provides a method and apparatus for providing distributed house scene programming and distributed control of a home automation and control system. According to one embodiment of the present invention, each device participating in a home automation and control system is embedded with control logic for providing distributed control. Through the control logic, each device maintains scene definitions describing the state of the device for each scene in which it participates.

When any device in the system receives a request to launch a scene, such as a scene trigger button press on one of the devices, the device broadcasts a scene state change message to all devices within the home automation and control system. The scene state change message identifies to each device a particular scene that should be launched. Each device in the system receives the message and determines whether the device is a participant in the scene. If the device is a participant in the scene, the device adjusts its state according to a scene definition associated with the scene stored in the device. In particular, the device may adjust a controlled electrical load, such as a light or appliance, according to the scene definition by turning the load on, off, or setting the load to some intermediate value. In this manner, a scene may be launched across an entire home automation and control network.

In addition to providing a distributed home automation and control method, the present invention also provides a related computer-readable medium and system for providing distributed control of a home automation and control system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF ILLUSTRATIVE EMBODIMENTS

Figure 1:
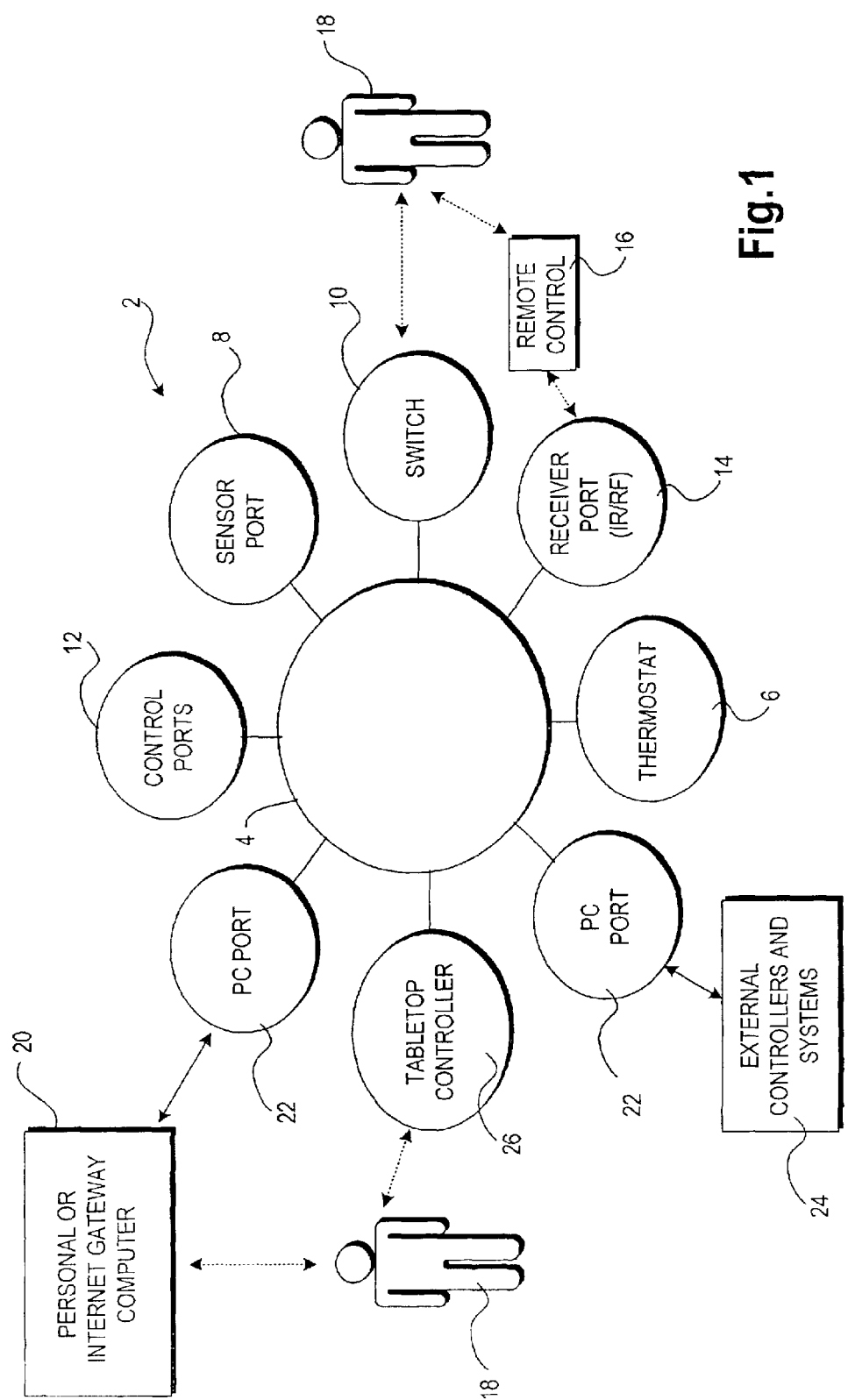
FIG. 1 is a block diagram showing an illustrative home automation and control system that provides an operating environment for an actual embodiment of the present invention.

The present invention is directed to a method and apparatus for providing distributed scene programming and distributed control of a home automation and control system. According to an embodiment of the present invention, a device is provided for use in a home automation and control system that includes control logic for local storage of its house scene participation states. When multiple such devices are utilized throughout a home automation and control system, control of the system is distributed among the devices. Referring now to the figures, in which like numerals represent like elements, an actual embodiment of the present invention will be described. FIG. 1 provides an overview of an illustrative home automation and control system 2 in which aspects of the present invention may be practiced. It should be appreciated that the use of the term "home automation and control" includes, but is not limited to, home automation, home control, home networking, or connected home systems, which describe a home where products are not only connected or integrated with each other locally, but also across the Internet and via other networks. Moreover, although the home automation and control system 2 is described herein as being implemented in a home environment, those skilled in the art should appreciate that such systems may be similarly deployed in a business, boat, factory, or other premises where environmental automation is desired.

The home automation and control system 2 typically comprises a number of participating devices connected together by a common bus 4, or some other communication means. In the actual embodiment of the present invention described herein, the bus 4 comprises typical household wiring. Those skilled in the art should appreciate, however, that other types of communications media may be utilized including twisted wire pair, coaxial cable, fiber optic cable, or other similar media. Additionally, wireless communications media, such as infrared ("IR") or radio frequency ("RF"), may also be utilized to provide inter-device communication.

The devices connected to the bus 4 and participating in the home automation and control system 2 may comprise a wide variety of devices for performing a wide variety of functions. For instance, such devices may include a thermostat control device 6 for controlling temperature, a sensor port device 8 for detecting motion, light, sound, or other activity, a switch device 10 for triggering scenes or controlling an attached load, and a control port device 12 for controlling an attached load, such as a lamp, appliance or motor. Additionally, such devices may include a receiver port device 14 for triggering scenes based on IR or RF signals received from a wireless remote control 16 operated by a user 18. External controllers and systems 24 may also participate in the home automation and control system 2 through the use of a PC Port device 22 produced by C-SMART LLC of Las Cruces, N. Mex. The PC Port device 22 provides an interface between devices compatible with the home automation and control system 2, and devices from other manufacturers that are not natively compatible with the home automation and control system 2.

The user 18 may interact with the home automation and control system 2 through the devices. For instance, the user 18 may utilize the switch device 10 to control a load connected to a control port device 12 or to trigger or launch a house scene. The user 18 may also interact with the home automation and control system 2 through the use of a personal or Internet gateway computer 20. The personal or Internet gateway computer 20 is connected to the bus 4 and may participate in the home automation and control system 2 through the use of a PC Port device 22. The PC Port device 22 provides bi-directional communication support for the personal computer 20. In this manner, a user 18 can interact with the home automation and control system 2 through the computer 20, which is equipped with appropriate software, to interrogate devices, create or launch scenes, and perform other functions. The PC Port device 22 provides bi-directional communication support for the personal computer 20. In this manner, a user 18 can interact with the home automation and control system 2 through the computer 20, which is equipped with appropriate software, to interrogate devices, create or launch scenes. The user 18 may also interact with the home automation and control system 2 through the use of a tabletop controller 26 to launch scenes.

User interaction for programming and controlling the home automation and control system 2 is described in greater detail below.

The home automation and control system illustrated in FIG. 1 does not rely on a central controller. Rather, control is distributed by adding intelligence to each device and locally storing the state for all scenes the device participates in. As will be described below with respect to FIG. 2, this intelligence takes the form of a microcontroller and other circuitry that provides functionality for distributing control of the home automation and control system 2 to each of the devices in the system.

Figure 2:
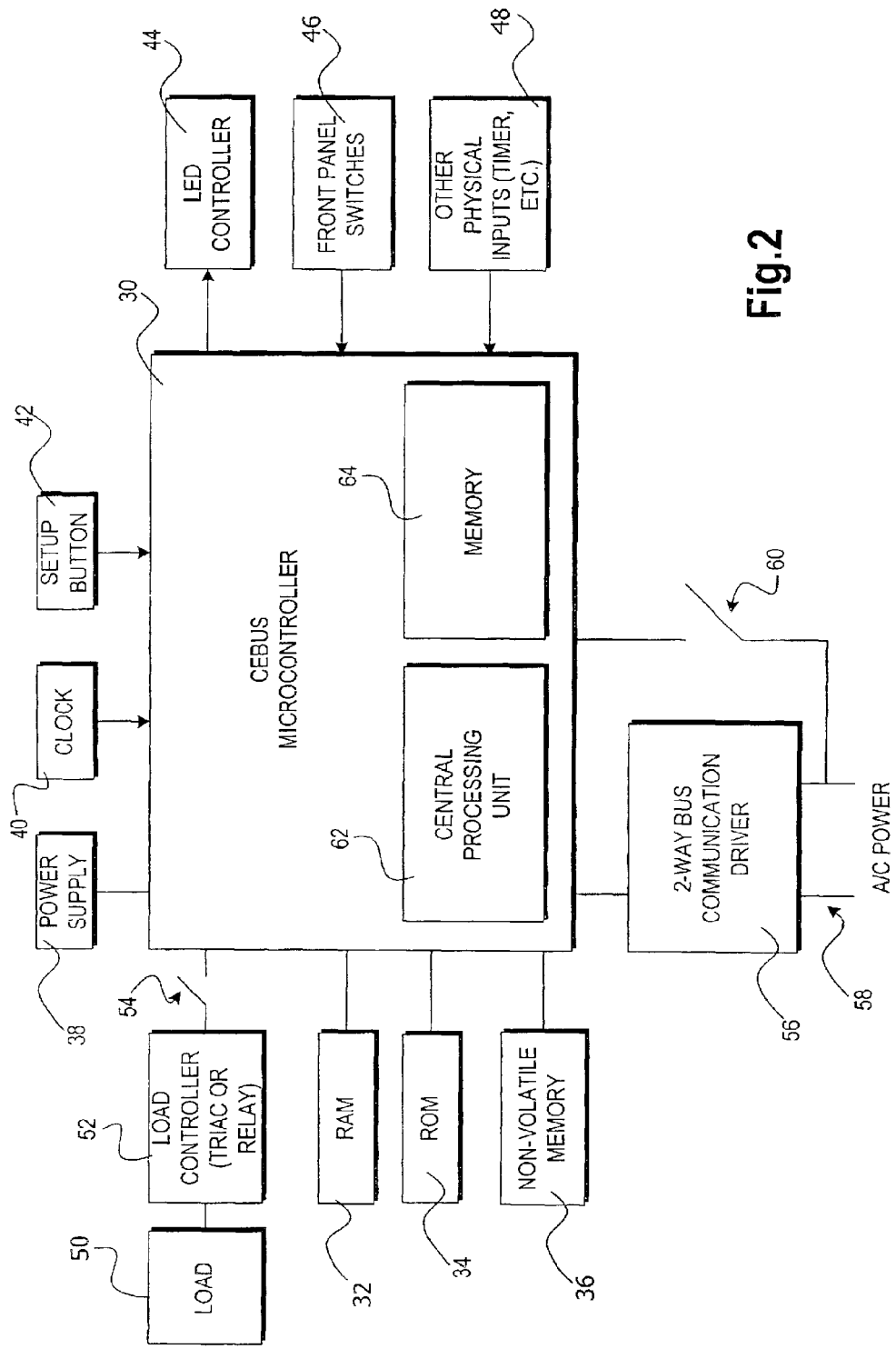
FIG. 2 is a block diagram showing a microcontroller and related circuitry that provides distributed control functionality and a simple programming interface in an actual embodiment of the present invention.

Turning now to FIG. 2, an illustrative microcontroller and related control logic will be described that provides distributed control functionality and a simple programming interface in the actual embodiment of the present invention described herein. As mentioned briefly above, according to the actual embodiment of the present invention described herein, the microcontroller and associated circuitry shown in FIG. 2 is incorporated into each device in a home automation and control system. By incorporating the same such circuitry in each device, control of the home automation and control system may be distributed to each device.

Those skilled in the art should appreciate that the house scene programming method of the invention is protocol independent and may be implemented using many types of protocols, such as the Simple Control Protocol, the Universal Plug and Play protocol which is run on a Local Area Network (LAN), the IEEE-1394 protocol, and other protocols known to those skilled in the art. The current embodiment applies this system house scene resource method using as its base communication protocol the CEBus protocol and Home Plug and Play protocol ("HPnP"), both from the CEBus Industry Council, Inc. At the heart of each device is a CEBus® microcontroller 30. The CEBus® microcontroller 30 comprises a central processing unit 62 and internal memory 64 for executing user programs, paired with functionality for interfacing with a power-line networking protocol, such as the CEBus® protocol from the CEBus® Industry Council, Inc. As known to those skilled in the art, the CEBus® standard (EIA-600) is an open standard for home automation that defines a common language for device communication over various media, including power lines. Those skilled in the art should appreciate that while the CEBus® protocol is utilized for device communication in the actual embodiment of the present invention described herein, other types of protocols may also be utilized.

In the actual embodiment of the present invention described herein, the CEBus® microcontroller 30 comprises a CEWay PL-One from the Domosys Corporation of Sainte-Foy, Quebec, Canada. The CEWay PL-One is a power line transceiver integrated circuit that integrates the CEBus® physical layer and embeds an 8052 microcontroller core. The CEWay PL-One includes 256 bytes of internal data memory, three 16-bit timers/counters, a full duplex serial port, and the ability to access up to 64 kb of external data memory and up to 64 kb of external code memory.

In the embodiment of the invention described herein, the CEWay PL-One is paired with an external random access memory ("RAM") 32, an external read-only memory ("ROM") 34, and a writeable non-volatile memory 36, such as flash memory. As will be described in greater detail below, the non-volatile memory 36 may be used to store and retain scene settings for the device when power is removed. These memory devices may also store computer-readable instructions, data structures, program modules or other data necessary for providing the functionality described herein.

The CEBus® microcontroller 30 is also paired to a load 50 through a load controller 52. The load 50 comprises an electrical load, such as that provided by a lamp, electrical equipment, or other home appliance. The load controller 52 may be capable of sensing the level of the load 50 and is capable of setting the load 50 to a particular level. The load controller 52 communicates to the CEBus® microcontroller 30 so that sensing the level of the load 50 or setting the load 50 to a particular level may be accomplished under programmatic control. According to the actual embodiment of the present invention described herein, the load controller 52 may comprise a triac, for gradually varying the level of a load, or a relay for switching a load on or off. Other types of load control devices such as latching relays, bi-state relays, or other devices known to those skilled in the art may be utilized. The load 50 and load controller 52 may also be electrically isolated from the CEBus® microcontroller 30 through the use of a switch 54, such as an air-gap switch.

The CEBus® microcontroller 30 may also interface with an alternating current ("A/C") power line 58 through the use of a 2-way bus communication driver 56. The 2-way bus communication driver 56 receives data transmitted on the A/C power line 58 and converts this data to a signal compatible with the CEBus® microcontroller 30. The CEBus microcontroller 30 may be electrically isolated from the A/C power line 58 through the use of a switch 60, such as an air-gap switch. As known to those skilled in the art, the CEBus® microcontroller 30 may also receive electrical power from a power supply 38 and a clock signal from a clock 40.

The CEBus® microcontroller 30 also interfaces with several input and output devices. In particular, the CEBus® microcontroller 30 interfaces with a light emitting diode ("LED") controller 44. The LED controller 44 provides functionality for driving one or more LEDs mounted on the device. As will be described in greater detail below, the LEDs may be used to provide an indication to the user as to whether the device is in a normal operation mode, a programming mode, or in another state.

The CEBus® microcontroller 30 also receives input from a number of front panel switches 46. The front panel switches 46 may be mounted on a panel of the device accessible to the user. These switches may be utilized to control a local load 50, or to trigger a scene that includes other devices. Additionally, a dedicated setup button 42 may be provided for placing the device into HPnP network configuration modes. According to the actual embodiment of the present invention described herein, the setup button 42 is located behind a face plate of the device to prevent inadvertent selection of the programming mode. Other physical inputs 48 may also be provided to the CEBus® microcontroller 30, such as a timer. The front panel switches 46 and the setup button 42 are described in greater detail below with respect to FIGS. 3A–3C.

Figure 3:
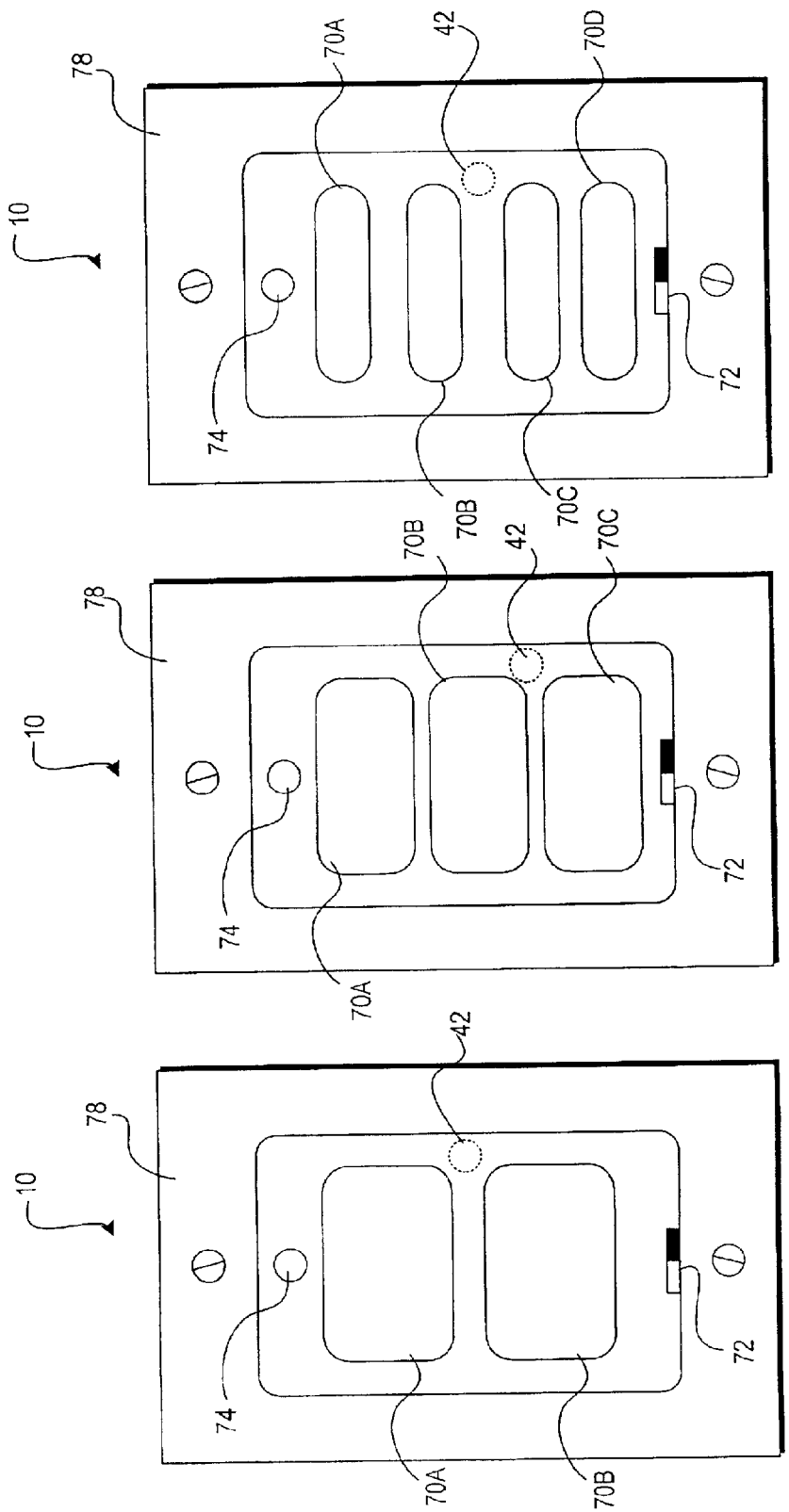
FIGS. 3A–3C are block diagrams showing illustrative switch devices utilized in an actual embodiment of the present invention.

Referring, now to FIG. 3A, an illustrative switch device 10 will be described. In the actual embodiment of the present invention described herein, the switch device 10 provides a primary interface for a user to the home automation and control system. In particular, the switch device 10 may be utilized by the user to control a local load, to program a scene, and to trigger a scene. In this regard, the switch device 10, including the CEBus® microcontroller and related circuitry, is mountable within a standard wall-mount switch plate receptacle. Those skilled in the art should appreciate that while the switch device 10 is described herein as the primary interface to the home automation and control system, the functionality and interface provided by the switch device 10 for controlling loads, programming scenes, and launching scenes may be similarly provided by other types of devices.

As described above, the switch device 10 includes the CEBus® microcontroller and related circuitry for interfacing with the home automation and control system and for providing the user interface. The switch device 10 also includes one or more buttons 70A–70B. In the actual embodiment of the present invention described herein, one of the buttons, such as 70A, is dedicated for local load control. The local load control button may utilize a dimmer to gradually change the value of the local load to which the switch is connected, such as a light. Alternatively, the local load control button may be utilized in connection with a relay for turning the local load on or off.

If the local load control button utilizes a dimmer, the load button may be held down to gradually ramp the local load up from its current state or to gradually ramp the local load down. The ramp up continues until the load button is released, or until it reaches its maximum value state. The ramp down continues until the load button is released, or until it reaches its minimum value state. The ramp direction, up or down, toggles each time the load button is pressed. Those skilled in the art will appreciate that the indications and actions of the load button control may depend on the type of load being controlled. As will be described in greater detail below, scenes may be assigned to the remaining buttons on the switch device 10. These buttons may then be utilized to trigger the assigned scene. Those skilled in the art should appreciate that the switch device 10 may be provided in a three-button 70A–70C or four-button 70A–70D configuration as shown in FIGS. 3B and 3C, respectively. Other configurations of the buttons on the switch device 10 will be apparent to those skilled in the art.

The switch device 10 also includes a visible LED 74. In another actual embodiment of the invention herein described, the LED 74 comprises a tri-state LED capable of displaying the colors red, amber, and green. The LED 74 provides a visual indication to a user regarding the current state of the switch device 10. For instance, one color of the LED 74 may indicate to the user that the switch device 10 is in a programming state and another color may indicate that the switch device 10 is in a normal operating state. The LED 74 may also be flashed in patterns in combination with the colors to provide other types of notifications. The LED 74 is controlled by the LED controller 44 described above with reference to FIG. 2.

The switch device 10 also comprises a setup button 42. As will be described in greater detail below, the setup button 42 is utilized to place the switch device 10 into one or more programming modes. In order to avoid inadvertent selection of the setup button 42, preferably, the button is positioned so as to avoid accidental presses. In the actual embodiment of the invention described herein the setup button is mounted behind a switch device cover 78. In order to access the setup button 42, therefore, a user must remove the retaining screws and the switch device cover 78. If the local load control button utilizes a dimmer then the switch device 10 also includes an air-gap switch 72 for electrically isolating the local load from the power source.

Figure 4:
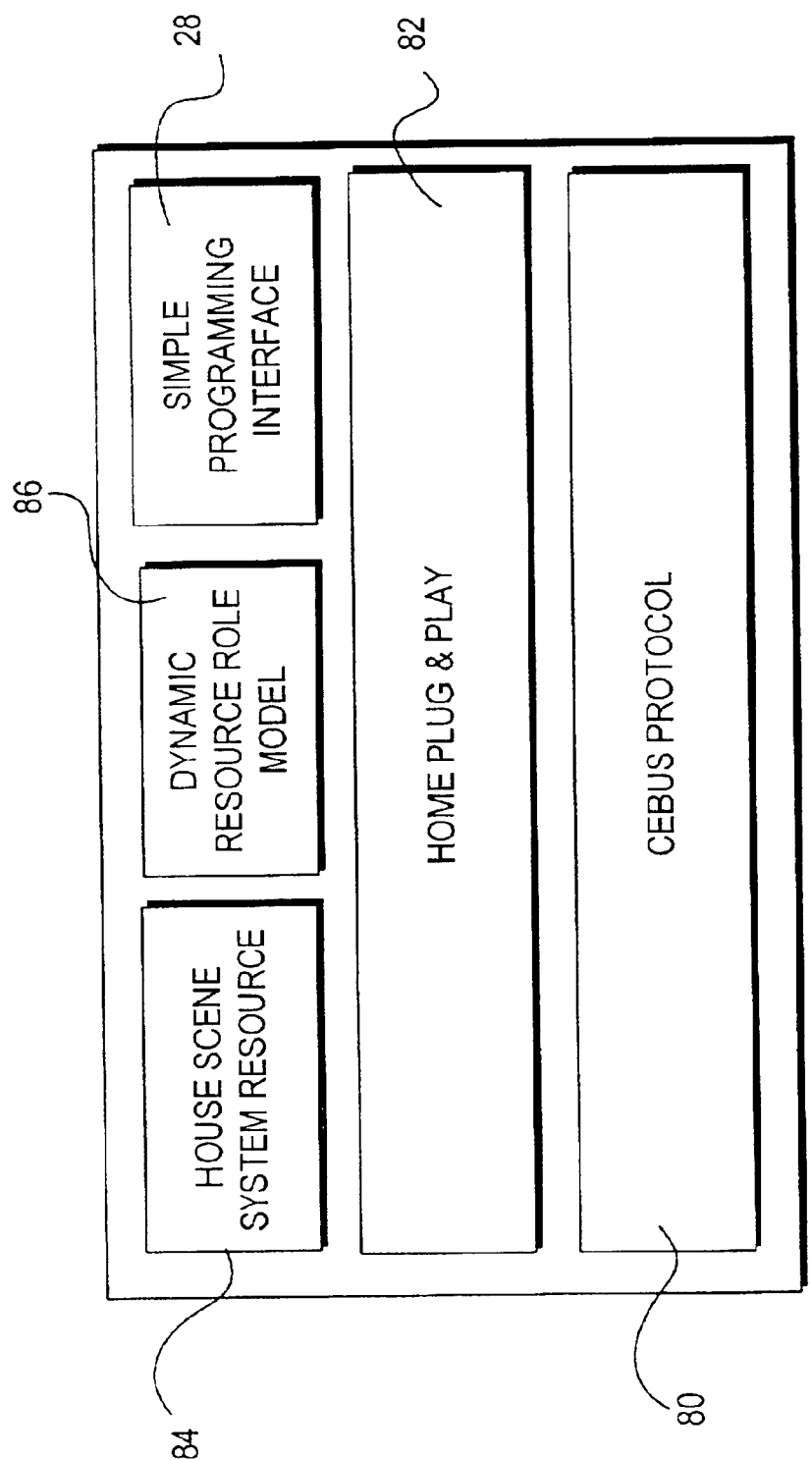
FIG. 4 is a block diagram showing the software architecture utilized in an actual embodiment of the present invention.

FIG. 4 illustrates a software architecture for implementing aspects of the present invention. As described briefly above, each device utilized in a home automation and control system according to the present invention includes a microcontroller and related circuitry for distributing control of the home automation and control system to each device and for providing a simple programming (SPI) interface. To provide such functionality, each device implements the CEBus® protocol 80 for low-level communication.

As known to those skilled in the art, the CEBus® protocol uses 120 v, 60-cycle, electrical wiring to transport messages between devices. Particularly, the CEBus® protocol 80 uses spread spectrum technology to overcome communication impediments found within electrical powerlines. Spread spectrum signaling works by spreading a transmitted signal over a range of frequencies, rather than using a single frequency. The CEBus® protocol 80 spreads its signal over a range from 100 Hz to 400 Hz during each bit in a data packet. However, instead of using frequency hopping or direct sequence spreading, the CEBus® protocol 80 sweeps through a range of frequencies as it is transmitted. As mentioned above, the CEWay PL-One from the Domosys Corporation implements the physical layer of the CEBus® protocol 80. Other layers of the CEBus® protocol 80 may be implemented in software.

One layer above the CEBus protocol 80 sits the Home Plug & Play protocol 82, also from the CEBus Industry Council, Inc. The Home Plug and Play protocol 82 implements the Home Plug and Play Specification that provides a uniform implementation for using the Common Application Language ("CAL") (EIA-721), from the Electronic Industries Alliance ("EIA"), as a language for inter-device communication. CAL is a high-level command language used by devices for communication over CEBus®. The Home Plug and Play protocol 82 provides uniform implementation rules for CAL, accommodates various communication protocols so that it works with multiple home network transports, defines common household objects through an object-oriented language, formalizes status, listener, and request objects, uses loose coupling to share status reports, and provides other functionality as known to those skilled in the art.

A house scene system resource 84, a dynamic resource role model 86, and a simple programming interface ("SPI") 88 all sit above the Home Plug and Play protocol 82. While the house scene system resource 84, the dynamic resource role model 86 and the SPI 88 can be implemented independently of each other, they are preferably used together. When used together, the house scene system resource 84, the dynamic resource role model 86, and the simple programming interface 88 maximize the benefits provided separately by each of these elements. Therefore, all three are used in the preferred and actual embodiment of the present invention described herein. The house scene system resource 84 when combined with the SPI 88 creates both distributed programming and distributed control with no single point of failure. The dynamic resource role model 86 enables a more efficient and compact implementation of the house scene system resource 84 and the SPI 88.

The dynamic resource role model 86 provides resource management for subscriber-publisher based automation and control system protocols, such as the CEBus 80 and Home Plug and Play 82. In a subscriber-requester based protocol, also called subscriber-publisher protocol, the system consists of device resources made up of "objects" that interoperate with each other depending on their role. The subscriber or member role provides a way for a device resource to be affected by other devices. The requester role provides a way for a device to affect other devices. In normal operation, requester objects from one resource send commands to associated subscriber resource objects. The dynamic resource role model 86 provides dynamic resource object role selection, enables new roles, gives resources the ability to assign allowed roles and provides for role protection. Preferably, the dynamic resource role model 86 allows the same resource object to have multiple roles. A resource object with both requester and subscriber roles can both affect and be affected by one or more resources. The ability for a resource object to function both as a requester and a subscriber simplifies the implementation of system-wide resources such as house scenes that, unlike device specific resource objects, need system wide resource status feedback. The dynamic resource role model 86 provides efficient system wide system resource status updating in the preferred and actual embodiment of the present invention. Further details about the dynamic resource role model 86 are discussed in U.S. patent application Ser. No. 10/153,419 titled "Method and Apparatus for Providing A Dynamic Resource Role Model for Subscriber-Requester Based Protocols in a Home Automation and Control System," filed concurrently herewith, the subject matter of which is incorporated herein by reference.

The simple programming interface ("SPI") 88 provides a simple and consistent user interface for programming scenes and multi-ways within a home automation and control system. The SPI allows unlimited scene member adjustments before finalizing a scene and automatically keeps track of all scene members, thereby reducing scene programming time and error rate. The SPI creates uniquely identified scenes by putting all devices in the home automation and control system in a system wide scene programming mode when starting a programming session. Each and every scene member device is adjusted as many times as desired in any order. When all member devices have been adjusted to the final desired states, a trigger for the scene is selected, completing that programming session. At the end of a programming session, each device knows if its load button has been used to adjust an associated load since the start of the last programming session and not subsequently removed as a scene member. If this condition is met, the device knows that it is part of the scene being programmed and that the device load control state value in the house scene is the current device load control state value. Devices also know that if they have not been adjusted since the start of the last system programming session or have not been adjusted since they were last removed from the scene, they are not part of the scene being programmed in this programming session. The selection of the scene trigger initiates the capture of the created scene, ends the current programming session, and starts a new programming session. Further details of the SPI can be found in U.S. patent application Ser. No. 10/154,403 titled "Method and Apparatus for Providing Distributed Scene Programming in a Home Automation and Control System," filed concurrently herewith, the subject matter of which is incorporated herein by reference.

The house scene system resource 84 is described in greater detail below with respect to FIGS. 5–10. The house scene system resource 84 draws on both the standard Home Plug and Play protocol 82 and the CEBus protocol 80 to perform the needed functionality. The house scene system resource 84 also draws on both the SPI 88 and the dynamic resource role model 86 to maximize the benefits of the house scene system resource 84 functionality.

As noted above, those skilled in the art should appreciate that while the foregoing protocols are presently preferred and are employed in an actual embodiment of the invention, the present invention is protocol independent and may be implemented using many types of protocols, including, but not limited to, the Simple Control Protocol, the Universal Plug and Play protocol for a Local Area Network (LAN), the Home Plug and Play protocol known as HPnP, the IEEE-1394 protocol, Consumer Electronics Bus known as CEBus, PowerBus, and other protocols known to those skilled in the art.

The actual embodiment of the invention described herein uses as its base communication protocol the CEBus protocol 80 from the CEBus Industry Council, Inc. The CEBus protocol is expanded by the Home Plug & Play protocol 82, also from the CEBus Industry Council, Inc. The CEBus protocol expanded by the HPnP protocol provides a uniform implementation for using the Common Application Language ("CAL") (EIA-721), from the Electronic Industries Alliance ("EIA"), as a language for inter-device communication. CAL is a high-level command language used by devices for communication over CEBus®. The Home Plug and Play protocol provides uniform implementation rules for CAL, accommodates various communication protocols so that it works with multiple home network transports, defines common household objects through an object-oriented language, formalizes status, listener, and request objects, uses loose coupling to share status reports, and provides other functionality as known to those skilled in the art.

The CEBus defined CAL household objects are based on distinct device subsystems that are modeled as resources. Each resource subtype has its own different resource contexts and objects.

The actual embodiment using the CEBus and HPnP protocol defines a system "house scene" resource also called a house scene context. The actual embodiment uses the HPnP defined context channel number method with the house scene resource for the unique scene identifier. Each house scene stored by a device requires a separate house scene resource copy or instance in the device. To enable the device to be a participant of many different house scenes, where the device load level in each house scene may be very different, the device requires an internal device resource instance for each desired house scene. These house scene resource instances are in addition to the applicable CEBus subsystem resource in a device, and act in parallel with the device specific subsystem resource. Each device has multiple instances of the house scene resource, and each resource instance is capable of being assigned a unique house scene resource channel number. The device internal resource instance most recently commanded to action, either one of the house scene resource instances or the subsystem resource instance, has control over the product or appliance controlled by the device controller at any moment. Since the scene "in totality" is the system resource, the devices only have to understand the house scene resource context and objects in order to launch and/or be a participant of a house scene. As long as a totally new device understands the house scene resource, it can be included in a scene with any other subsystem device that understands the house scene resource. An existing device can trigger a house scene containing a new device that may have been created, developed or thought of long after the trigger device was deployed, because the existing device does not need to understand how to communicate with the new device, only with the new device's house scene resource. No device specific subsystem instance is actually required in a device in order to be a participant of a house scene.

This invention is different from traditional CEBus systems. CEBus subsystems cannot talk to each other without an interpreter such as a central controller or a programming tool. While an interpreter can overwrite the normal CEBus subsystem communication to control a different subsystem type, multiple different subsystem types cannot be controlled. CEBus attempts to reduce the number of resource commands needed for one scene by "lumping" together devices so that they all act as a group to achieve the same end state. To achieve individual independent state values, individual device control is required. The HPnP protocol was created to solve CEBus problems, and makes it easier to group together separate resources into zones with unique channel numbers assigned to each zone. The zone members act in unison in the same manner in response to commands sent with their associated zone channel number. Devices of the same subtype cannot be in more than one zone at a time. Thus, the HPnP extension only extends the individual resource control mindset. For example, a scene launch source employing CEBus with HPnP that needs to activate 5 subsystems in a particular scene needs to send 5 different messages originating in 5 different internal contexts to individually control each subsystem type. The HPnP state vector allows one compound command to include sending all the sub-state information for each different subsystem in the scene at once. But if a new subsystem type is added, the scene launcher must be upgraded to know or be programmed to know how to address the new subtype, or the new subtype cannot be added to the scene.

In accordance with this invention, devices participate in house scenes as scene members or scene triggers. A device may both trigger a scene and be a member of that scene, only trigger that scene, only be a scene member, or not be a participant in a scene.

Figure 5:
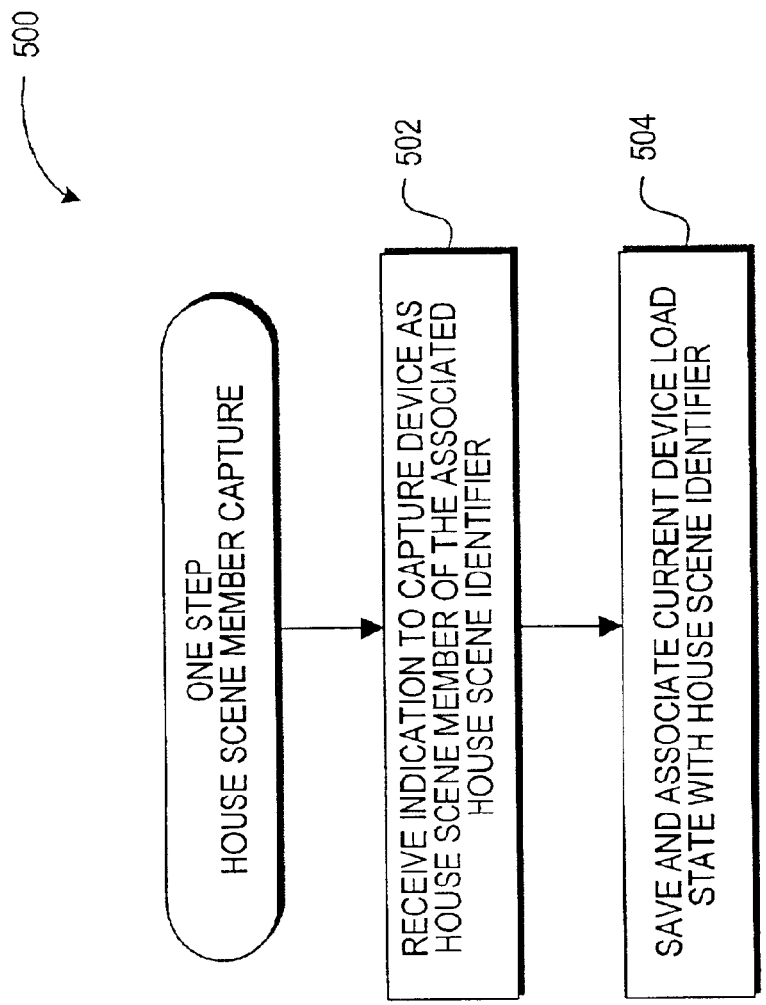
FIG. 5 is a flow diagram showing a routine for locally capturing a house scene value in a device according to an actual embodiment of the present invention.

FIG. 5 illustrates a routine 500 showing house scene member creation using a one-step indication according to the actual embodiment of the present invention described herein. Routine 500 starts at block 502 where a device is given an indication to learn or capture its scene member state for a house scene associated with the provided house scene identifier. Routine 500 then proceeds to block 504 where the device saves the current device load state as the house scene load state scene associated with the provided house scene identifier. The actual embodiment of the present invention described herein uses as the indication the receipt of a special message from the network, called macro 21. Macro 21 is one of the available macro numbers defined by CEBus 80 as reserved for manufacturer specific functions. Macro 21 contains within it the house scene identifier and house scene participation status, in this case house scene membership. Those skilled in the art will appreciate that the exact form of the indication provided may vary and may depend at least partially on the protocol implemented.

Those skilled in the art will appreciate that a manual indication may be given to a device to learn or capture its scene member state for a house scene. The indication used depends on the manual user programming interface implemented. The actual embodiment of the present invention described herein uses the SPI 88 as its manual user programming interface, where the indication is provided in two parts. In SPI 88 programming, the device receives a device specific manual indication that the device is a scene member that sets the device to the desired scene state, and a later system wide indication to member devices to capture the scene.

Figure 6:
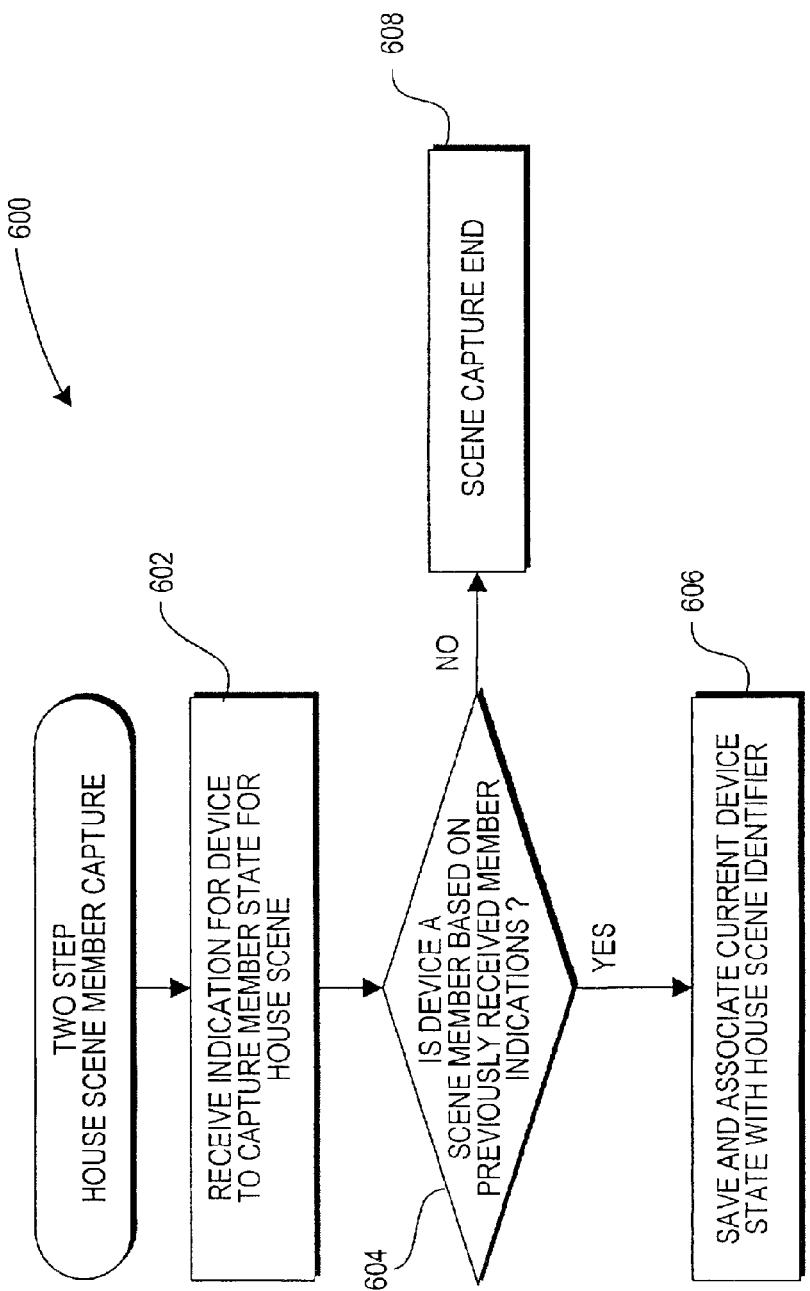
FIG. 6 is a flow diagram showing a routine for conditional local capture of a house scene value in a device if that device is a member of the scene being programmed according to an actual embodiment of the present invention.

FIG. 6 illustrates a routine 600 showing house scene member creation using SPI 88 indications according to the actual embodiment of the present invention described herein. Routine 600 starts in block 602 where a device receives an indication to capture its scene member state for a house scene. In the actual embodiment of the invention, the indication that the SPI sends is the HPnP 82 macro 20 binding macro containing the house scene channel number that is the house scene identifier. The macro 20 command indication is broadcast by a device in SPI scene programming mode after a trigger button on that device is pressed to capture a scene during a scene programming session, and the trigger device has acquired a house scene identifier for the scene to be captured. From block 602, the routine 600 proceeds to block 604 where a test is made to determine if the receiving device is a member based on previously received member indications, such as an adjustment on the load. If the device is a scene member of the house scene being captured, the routine 600 moves from block 604 to block 606 where the device saves the current device load state as the house scene load state scene associated with the provided house scene identifier. If the device is a not a member of the house scene being captured, the routine 600 branches from block 604 to block 608 where the scene capture ends because there is no scene membership to capture on the device.

Figure 7:
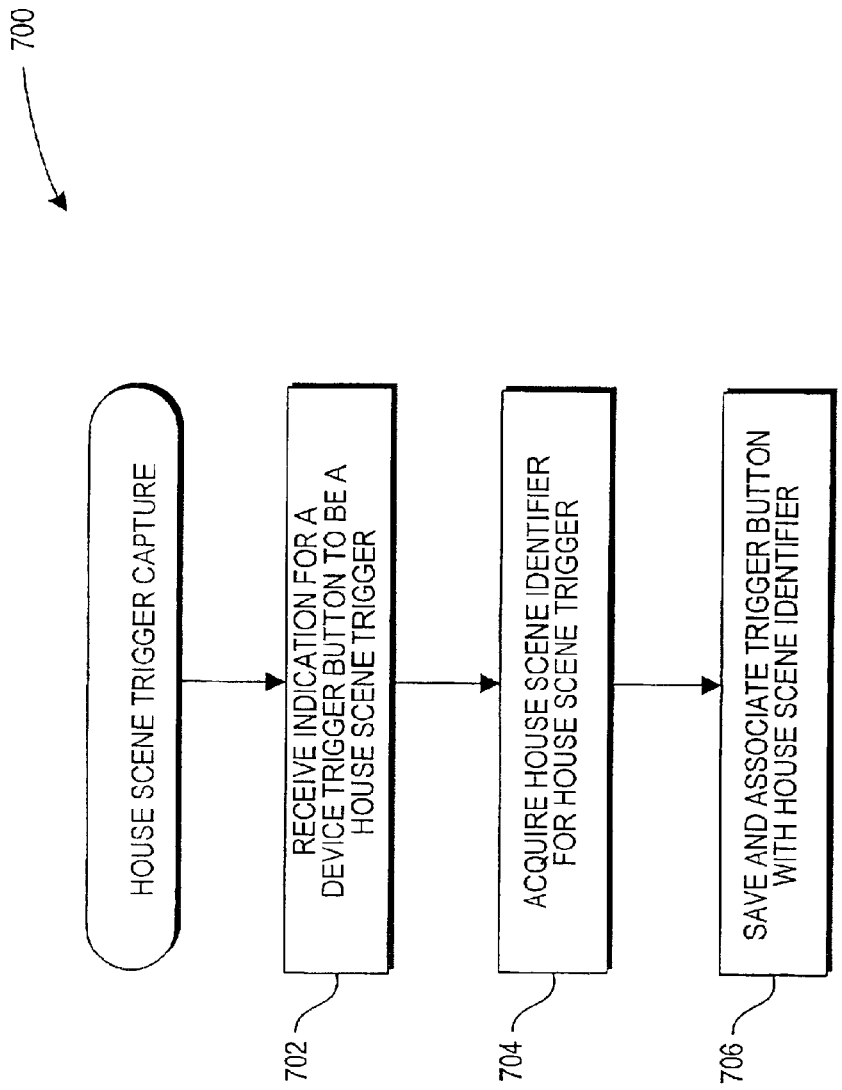
FIG. 7 is a flow diagram showing a routine for capturing a house scene trigger in a device according to an actual embodiment of the present invention.

FIG. 7 illustrates a routine 700 showing house scene trigger creation using SPI 88 indications according to the actual embodiment of the present invention described herein. Routine 700 starts in block 702 where a device is given an indication, such as a press on a trigger button on the device during a SPI 88 scene programming session, to select its trigger button as a scene trigger for a house scene. The routine 700 then proceeds to block 704 where it acquires the house scene identifier for the scene. As previously mentioned, trigger buttons may have fixed house scene identifiers associated with them, or a trigger button may learn a system resource house scene identifier to be associated with the actuating trigger button. The illustrated routine does not have a predefined house scene identifier associated with each trigger button; therefore, the trigger button must obtain a house scene identifier at the time when it is associated with a house scene. The house scene identifier is acquired by using the identifier of a copied house scene, if in SPI copied scene mode, or by hailing for an unused house scene identifier in the standard method for acquiring a resource identifier provided by the CEBus protocol 80 and HPnP protocol 82 standards in SPI new scene mode. This process is referred to as resource channel hailing in the HPnP protocol 82. Those skilled in the art will appreciate that the activities performed to acquire a house scene identifier may vary depending on the protocol implemented. After a house scene identifier is acquired, the routine 700 proceeds to block 706 where the device associates the selected trigger button with the acquired house scene identifier.

The actual embodiment of the present invention also uses the receipt of a special message from the network, called macro 21, as an indication to select a trigger button for a house scene. As previously discussed, macro 21 is one of the available macro numbers defined by CEBus 80 as reserved for manufacturer specific functions. Macro 21 contains within it the house scene identifier and house scene participation status, in this case as house scene trigger.

Figure 8:
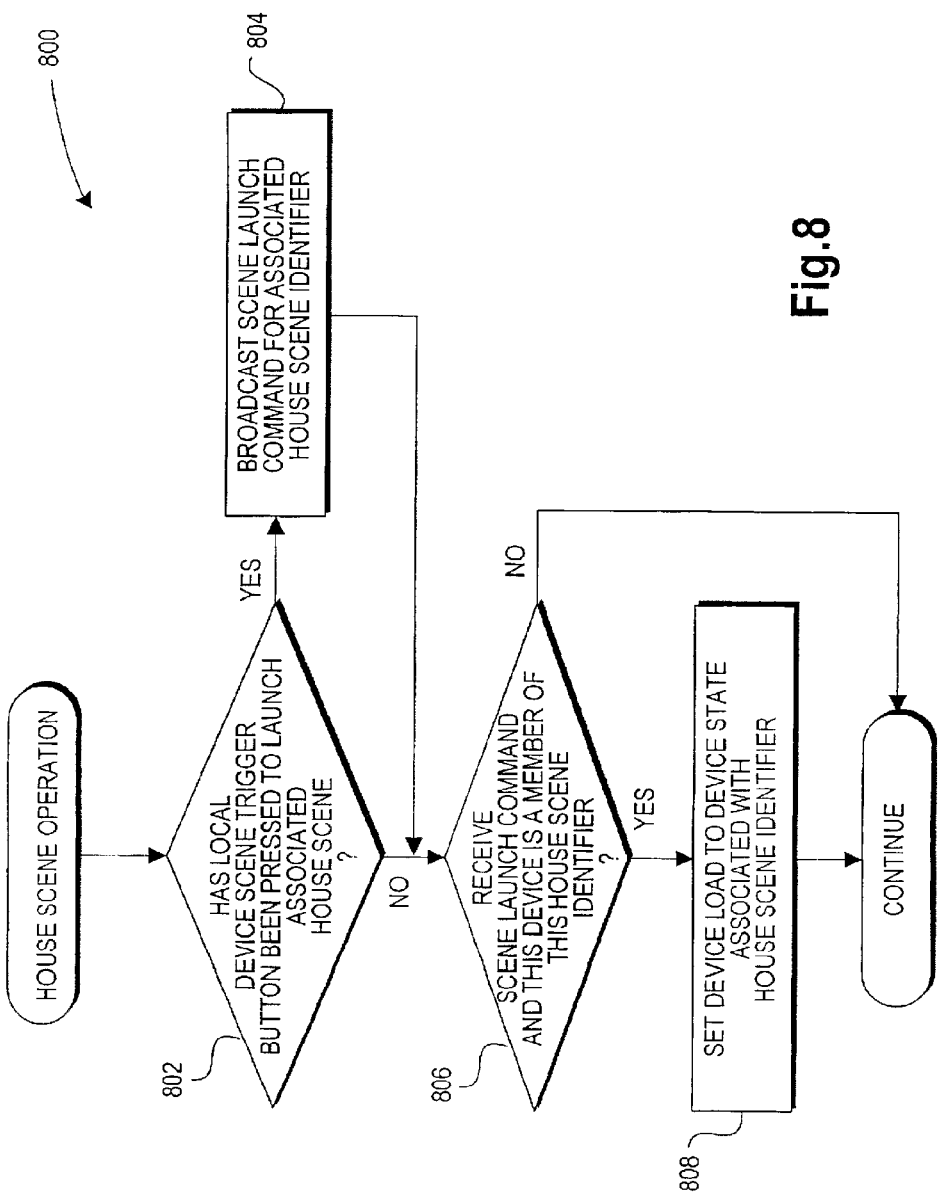
FIG. 8 is a flow diagram showing a routine for providing normal mode house scene operation in a device according to an actual embodiment of the present invention.

FIG. 8 illustrates a routine 800 showing a house scene launch during normal operation according to the actual embodiment of the present invention described herein. The routine 800 starts in block 802 where a test is made to determine if an indication to launch a house scene, such as pressing a scene trigger button on the device, has been received. If a launch scene indication has been received, the routine 800 branches to block 804 where a scene launch command for the house scene associated with that trigger button is broadcast. Then the routine 800 proceeds to block 806. If a local launch scene indication has not been received, the routine 800 also proceeds to block 806. In block 806, a test is made to determine if a scene launch command has been received, either locally or from a remote source and, if received, if the device is a member of the identified house scene. If the device is a member of the identified house scene, the routine 800 proceeds to block 808 where the device sets its load to the load state associated with the house scene identifier. If the device is not a member of the identified house scene, no further action is taken.

As previously mentioned, a device may be a member of many house scenes. The load of a device is controlled by the most recent action of a local load adjustment or the most recent scene launched that the device is a member of. A device maintains knowledge of the scene identity currently in control of the device load in the manner shown in FIG. 9 and described below. Sometimes it may be desirable for the home automation and control system to know if a house scene has lost control of one or more of its member devices because the device load is manually adjusted or a later house scene has taken control of the device load. This is important if one of the scene members can only be in a particular state if another device is in a particular state. For example, for safety reasons, some heaters require that the heat source only be on if the fan is also on, but the fan can be on without the heat source being on. So if a scene that turns both the fan on and the heater on loses control of the fan, the home automation and control system needs to know that the scene's control over all members has been compromised, so that corrective action can be taken. In a distributed control-based network of the type contemplated by this invention, no central controller is monitoring the overall system to sense the presence of such compromises. The invention compensates for this lack by each device notifying the home automation and control system of a system compromise if the device was controlled by a house scene, and the control of the device by that particular scene is lost. To reduce total traffic, compromise notification occurs only if the system was not previously notified that the house scene was compromised by another member of the compromised house scene. Compromise notification is for informational purposes only, and a system device will only perform an action after receiving compromise notification if the device has been programmed to do so. A new launch of the house scene causes the house scene to revert back to its uncompromised state. Those skilled in the art will appreciate that while the use of house scene compromise notification is not required to implement house scenes, the use of house scene compromise notification provides desirable feedback for many conditional events.

Figure 9:
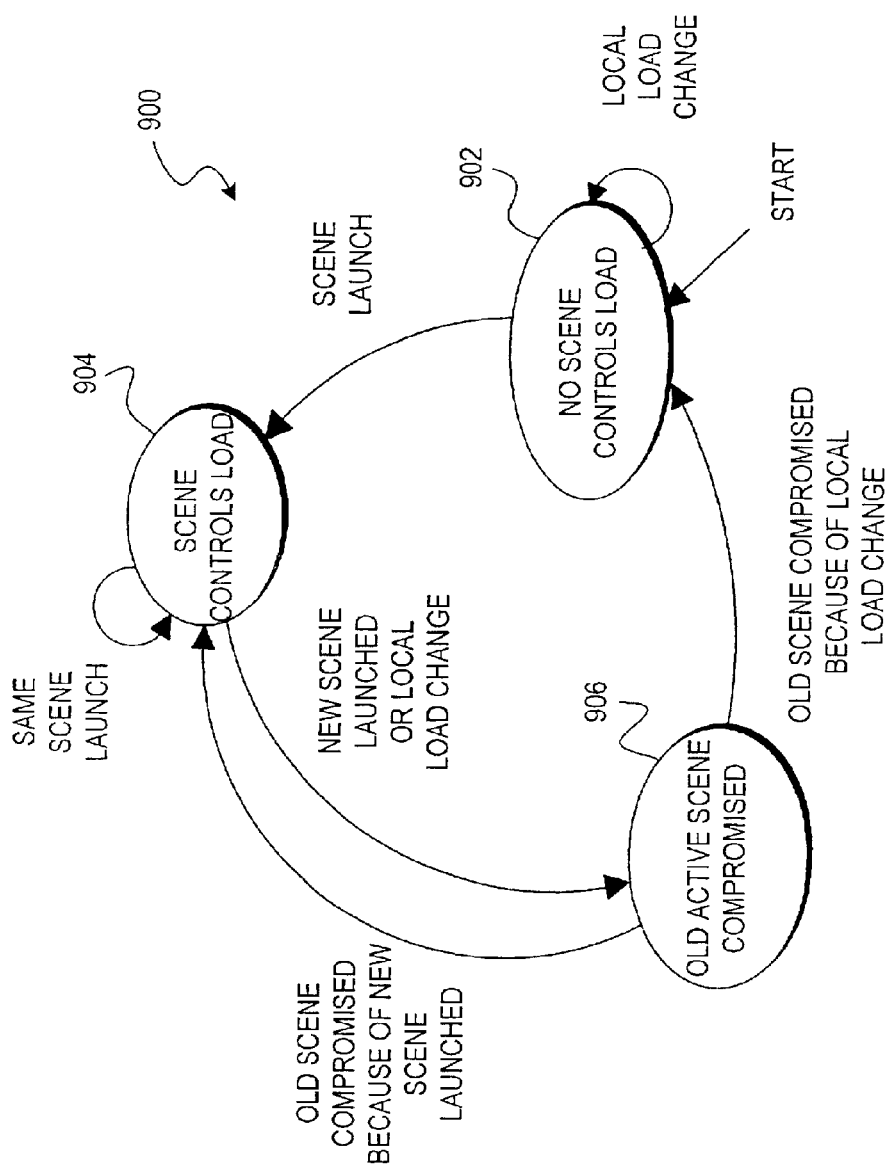
FIG. 9 is a state machine diagram showing the normal house scene operation of a device according to an actual embodiment of the present invention.

FIG. 9 illustrates a state machine 900 that maintains knowledge of the house scene currently in control of a device load and the compromised status of the house scene previously in control of the device load according to an actual embodiment of the present invention. Each device has its own state machine 900. In addition, each house scene in a device has its own compromise flag whose state identifies the compromised or not compromised status of the house scene. Those skilled in the art will appreciate that a device controlling multiple loads independently would require one state machine 900 for each unique local independently controlled load.

The state machine 900 begins at state 902 when the device is unused from the factory and no scene controls the load. If a house scene launch command is received from a local or remote source while in state 902 and the device is a member of that house scene, the state machine 900 moves to the scene controls load 904 state, with the house scene that was launched becoming the house scene in control of the load. If another house scene launch command for that same house scene is received from a local or remote source while the state machine 900 is in state 904, the state remains the same. If a new house scene launch command for a different house scene is received from a local or remote source and the device is a member of that new house scene, the state machine 900 temporarily proceeds to the old scene compromised state 906. When in the old scene compromised state 906, the state machine compromises the house scene that was in control, sets that particular house scene status to compromised, and broadcasts the scene compromise status to the other devices of the home automation and control system. The state machine 900 then immediately proceeds back to the scene controls load state 904 with the new house scene set as the current house scene in control.

If a local load change occurs when the state machine 900 is in state 904, the state machine proceeds to the old scene compromised state 906. As a result, the house scene that was in control is compromised, resulting in that particular house scene status being set to compromised, and that particular house scene compromise status being broadcast to the other devices of the home automation and control system. The state machine 900 then immediately proceeds back to the no scene state 902. If a local load change occurs when the state machine 900 is in state 902, the state remains unchanged.

A house scene may be defined as having two states when launched—the "on" or activate state where the house scene launch causes all house scene member devices to go to their associated scene states, and the "off" or deactivate state, where all scene members go to a default value. When so defined, the default value may be the device off value, the last manually set device value, the value the device was at when last on, some set value chosen by a programmer, or any other value as defined by the implementation. This concept does not have to be implemented in order to have successful house scenes, but is useful to allow one button to turn scenes "on" and "off." However, if another scene with the same or some of the same members as a scene that is "on" is launched, the next press of a trigger button that toggles between launching the scene in the "on" and "off" may not meet the user's desire. The next press by the user may be due to a desire to launch the house scene "on," rather than turn the scene "off." In accordance with this invention, as described next, the compromised status of the house scene can be used to determine if the next house scene trigger should or should not launch the scene as "on."

Figure 10:
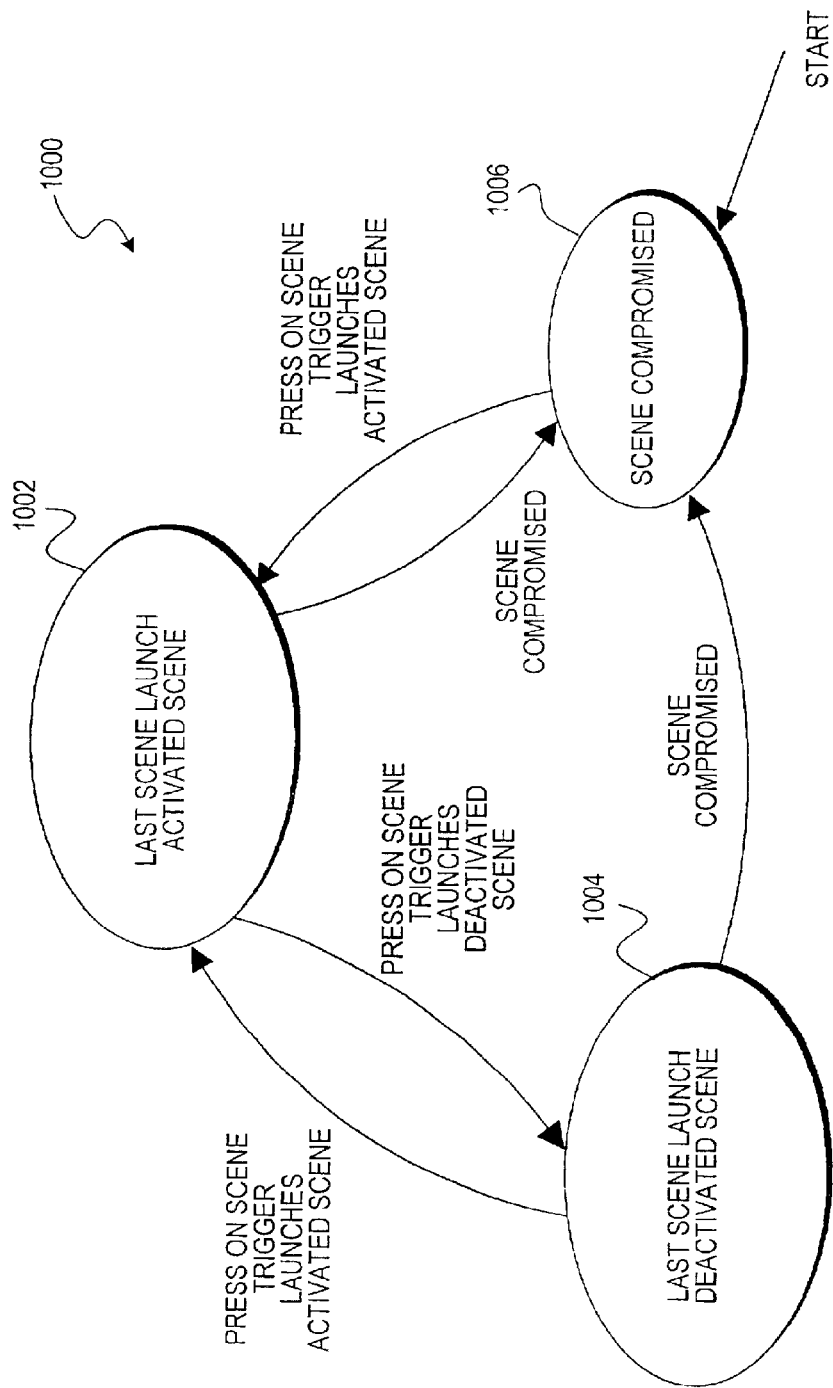
FIG. 10 is a state machine diagram showing toggling a house scene launch between the activate and deactivate scene states of a device according to an actual embodiment of the present invention.

FIG. 10 illustrates a state machine 1000 that maintains knowledge of the launching of the house scene in two scene states, and changes the next state launched with respect to the house scene compromise status of the house scene. The state machine 1000 begins at state 1006 when the scene is created. A press on the house scene trigger button causes the state machine 1000 to launch the scene in the activate state and transition from state 1006 to the house scene last activated state 1002. When in state 1002, a press on the house scene trigger causes the launch of the house scene in the deactivate state, and the state machine 1000 to transition to the house scene last deactivated state 1004. In state 1004, a press on the house scene trigger causes the launch of the house scene in the activate state, and the state machine 1000 transitions to the house scene last activated state 1002. The state machine 1000 will transition to state 1006 when a house scene compromise notification for that particular house scene is received, from the house scene last activated state 1002 or the house scene last deactivated state 1004. In one actual embodiment of the present invention, the house scene two states of activation and deactivation concept and the associated state machine illustrated in FIG. 10 are implemented as a programmable option, with the default being to launch all scenes as activated state.

Figure 11:
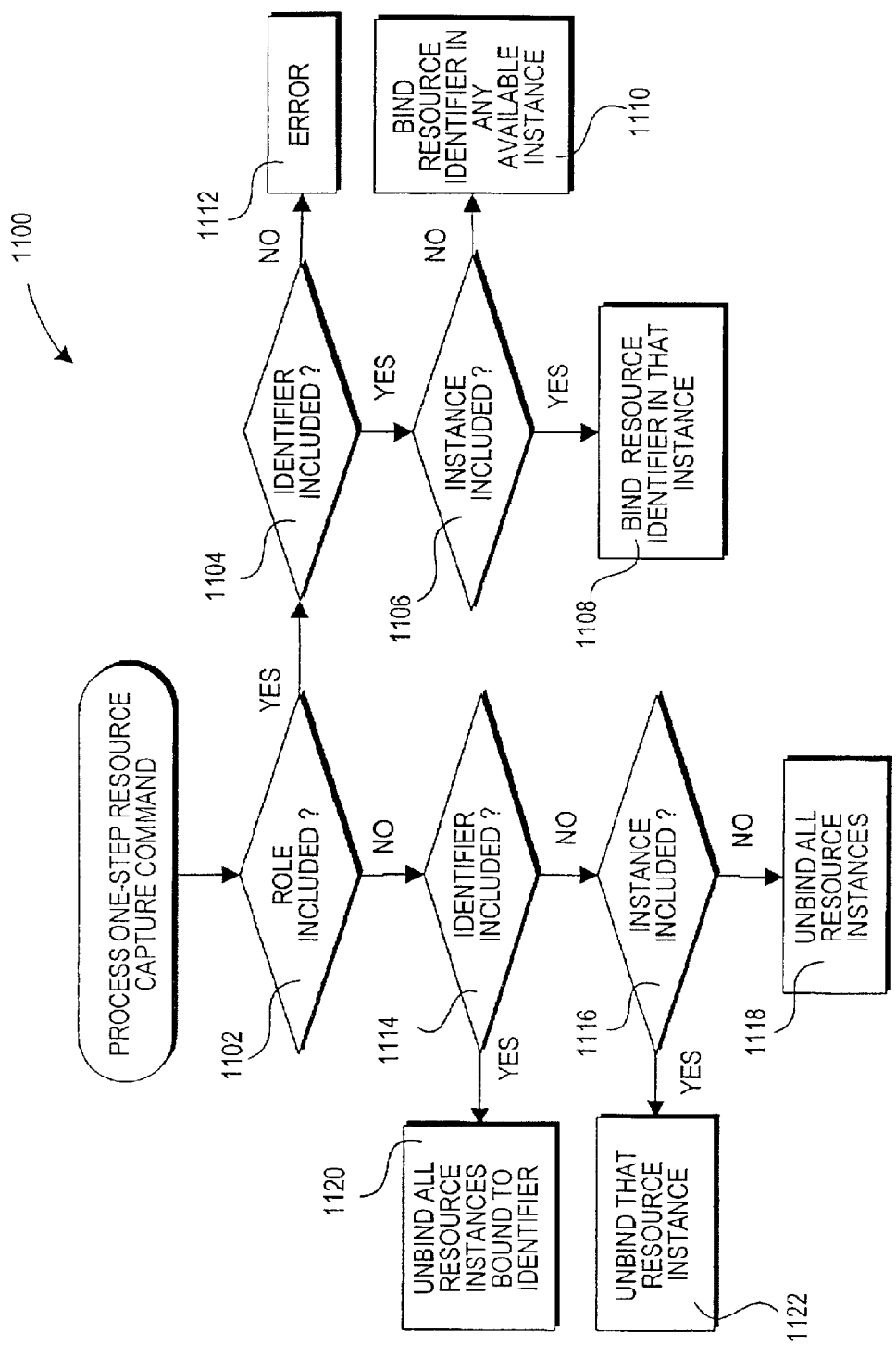
FIG. 11 is a flow diagram showing a routine for processing a one-step resource capture indication message.

A command message may be used to initiate single step house scene capture when the device does not know its roles in the scene being programmed. The exact form of the command message may vary and depends, at least partially, on the protocol implemented. One actual embodiment of the invention uses one of the available macro numbers (Macro 21) defined by CEBus 80 as reserved for manufacturer specific command functions. This embodiment allows multiple instances of a resource, such as house scenes, to be programmed. The Macro 21 contains information on the resource instance as well as the resource identifier, and resource participation roles. To minimize the length of the Macro 21 command, the actual embodiment determines the action to be taken when a command is received by the presence or absence of expected information in the command. The presence of a valid role implies the command is requesting a binding action. The absence of a valid role implies the command is requesting an unbinding action. The presence of a specific resource instance implies that the action is to effect that particular instance only. The absence of a resource instance indicates that any applicable instance may be acted on. FIG. 11 is a flow diagram showing the processing of a generic resource Macro 21 command. While not shown in FIG. 11, as will be readily appreciated by those skilled in the art, actions specific to a particular type of resource will also be defined in implementations directed to accomplishing such specific actions.

FIG. 11 illustrates a routine 1100 showing the processing of a one-step scene capture command. The routine 1100 starts in block 1102 where a test is made to determine if the role information was included in the command message. If the role information has been included, the action requested is to bind a resource, and the routine 1100 branches to block 1104 where a test is made to determine if the resource network identifier information was included in the command message. If the resource network identifier information has been included, the routine 1100 branches to block 1106 where a test is made to determine if the resource instance information was included in the command message. If the resource instance information has been included, the routine 1100 branches to block 1108 where the resource instance becomes the instance used to bind or associated the scene identified by the house scene identifier. If the role indicates local membership status, the load state of the product or appliance is also associated with the house scene identifier. In block 1106, if the resource instance information has not been included, the routine 1100 branches to block 1110 where the first corresponding resource instance that is not currently in use becomes the instance used to bind or associated the scene identified by the house scene identifier. Again, if the role indicates local membership status, the load state of the product or appliance is also associated with the house scene identifier. In block 1104, if the resource identifier information has been not been included, the routine 1100 branches to the error handling block 1112, because no binding can take place without a resource identifier.

In block 1102, if the role information has not been included, the action requested is to unbind a resource, because no binding can take place without a resource identifier, and the routine 1100 branches to the error handling block 1114. At block 1114 a test is made to determine if the resource network identifier information was included in the indication message. If the resource network identifier information has been included, the routine 1100 branches to block 1120 where all resource instances bound to the resource identifier are unbound. If the resource network identifier information has not been included, the routine 1100 branches to block 1116 where a test is made to determine if the resource instance information was included in the indication message. If the resource instance information has been included, the routine 1100 branches to block 1122 where the resource instance is unbound. If the resource instance information has not been included, the routine 1100 branches to block 1118 where all the instances of the resource are unbound.

While the foregoing has described the presently preferred embodiment of the invention, as will be readily appreciated by those skilled in the art and others, various changes can be made therein without departing from the spirit and scope of the invention as defined by the appended claims.

What is claimed is:

1. A distributed control system for automatically controlling the operation of a plurality of products and/or appliances to create a scene comprising a plurality of programmable devices, each of said programmable devices:

capable of controlling the load status of an associated product or appliance;

in response to the programmable device receiving an indication to learn a scene, locally storing the programmable device's membership status in the scene and the load status of the associated product or appliance when the scene is launched;

in response to the programmable device receiving a launch command associated with the learned scene, adjusting the load status of the associated product or appliance to the stored load status associated with the scene; and including an indicator for indicating the status of the programmable device, wherein the status indicated by said indicator includes:
  (i) whether said programmable device is in a state suitable for receiving an indication to learn a scene; and
  (ii) whether said programmable device is in a state suitable for receiving a launch command.

2. A method for automatically controlling the operation of a plurality of products and/or devices to create a scene comprising:

distributing a plurality of programmable devices, each of said programmable devices associated with a product and/or appliance and capable of adjusting the load status of said product or appliance, each of said programmable devices including an indicator for indicating the status of said programmable device;

in response to said programmable device receiving an indication to learn a scene, said programmable device locally storing the membership status of the programmable device in the scene and the load status of the product or appliance with which said programmable device is associated;

in response to said programmable device receiving a launch command associated with a learned scene, adjusting the load status of the product or appliance with which the device is associated to the stored load status; and causing said indicator to produce a predetermined indication in response to the operational status of said programmable device, wherein the operational status indicated by said indicator includes:
  (i) whether said programmable device is in a state suitable for receiving an indication to learn a scene; and
  (ii) whether said programmable device is in a state suitable for receiving a launch command.

* * * * *